July 26, 1966     G. B. FOSTER ET AL     3,263,167
APPARATUS FOR MEASURING THE NON-LINEAR DIMENSION OF A WORKPIECE
Filed Oct. 4, 1962
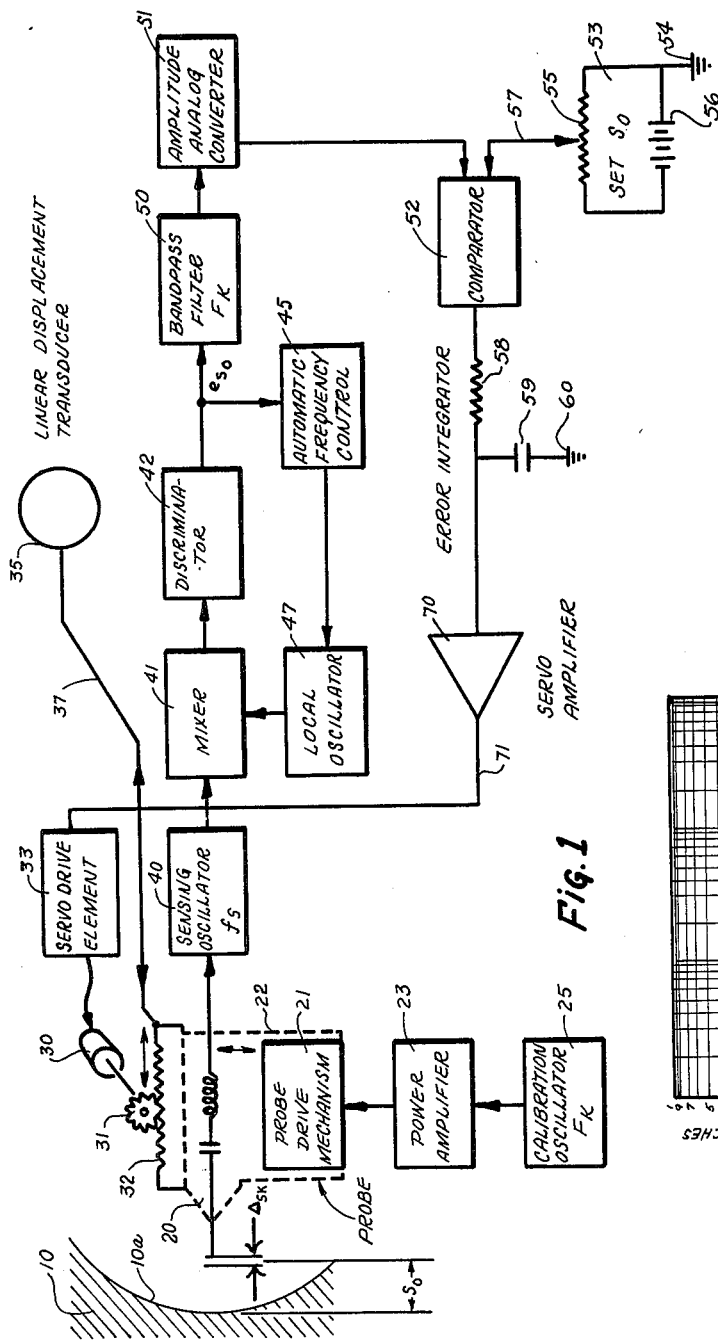
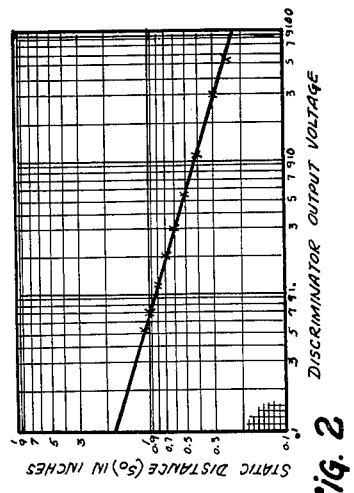
INVENTOR.
GEORGE B. FOSTER
BY HALL CARY

United States Patent Office 3,263,167
Patented July 26, 1966

3,263,167
APPARATUS FOR MEASURING THE NON-LINEAR DIMENSION OF A WORKPIECE
George B. Foster and Hall Cary, Worthington, Ohio, assignors, by mesne assignments, to The Reliance Electric and Engineering Company, Cleveland, Ohio, a corporation of Ohio
Filed Oct. 4, 1962, Ser. No. 228,436
7 Claims. (Cl. 324—61)

This invention relates in general to non-destructive and non-contacting industrial inspection systems and specifically to means for the continuous critical inspection of parts dimensions.

In most industrially produced products the physical dimensions after formation or machining are in the nature of being linear whether flat or round. That is, a sheet material will have a certain thickness and a pipe or rod will have a certain diameter. In other instances, however, the products being manufactured may be a semi-circle or curved wall. Again, the end product may have an odd shape, or even have varying shapes and sizes. An illustration of such a product having a varying shape would be a cam. In the constant size type of product there are innumerable instruments commercially available, both mechanical and electrical, that will automatically and continuously read out the dimension. However, in the inspection of the products having a varying shape, the methods and apparatus employed are entirely unsatisfactory, to say the least. Generally the inspection of this type of product requires a laboratory analysis which comprises taking sample products and articles and utilizing laboratory instruments for determining whether the dimensions are conforming to specification. Further, in most instances where the product has a series of varying shapes, such as a cam, only selected cams on the wheel will be inspected. As well understood, sample testing at its very best is unsatisfactory; this is especially true with respect to components having critical dimensions. Too often the one dimension that was not checked turns out to be the one that does not conform.

In one industrial type of prior art measuring system, a feeler gauge is employed in physical contact with the workpiece. The signal output from this pickup is compared with the output of another feeler gauge in contact with a standard sample. Although this system has found extensive use, it does have many disadvantages. The most serious objection to this prior art system is the requirement of physical contact, which may mark or wear the workpiece. Also with continued use of the standard sample, even though it may be made of hard steel, it too will show wear in time, and consequently lead to inaccuracies. In missiles, satellites, high speed aircraft, and many other present day developments, there is no room for error and it is absolutely necessary that every conceivable possible cause for failure be eliminated. In essence then, with an industrially produced product having varying shapes, such as a curved surface, or a cam, an inspection system that will examine each and every surface on each and every product produced, is necessary. In this way reliability and accuracy are assured—and if error should be noted, corrective action can be taken immediately.

The present invention does provide a non-contacting and non-destructive industrial inspection system that is capable of instantaneously and continuously measuring each and every varying surface of an industrially produced product. Consequently the present invention is not limited to laboratory use and may very readily be adapted to the industrial and military process.

This invention relates to and utilizes the invention disclosed in the co-pending application Serial Number 36,662 filed June 16, 1960, now Patent No. 3,180,136, for Transducer. There is disclosed in that application a highly sensitive non-contacting proximity probe which is mechanically vibrated at a controlled frequency and amplitude. The operation of this probe is described in detail in that application and it suffices to say here that the probe generates an alternating signal whose peak-to-peak amplitude is proportional to the average distance between the probe and the surface sensed and as a function of the electrical characteristics of the surface.

In accordance with the present invention the peak-to-peak amplitude of the signal is maintained at a constant value by continuously re-positioning the probe. In this way the relative spacing between the probe and the surface sensed is constant—provided the surface electrical properties remain constant. The amplitude of the signal is utilized as reference information for positioning of the probe to a fixed spacing. Information relative to the static positioning of the probe is then remotely recorded as the analog output of a linear displacement transducer coupled to the positioning device.

Accordingly, it is a primary object of the present invention to provide a new and improved inspection system for determining the critical dimensions of component parts.

It is a further object of the present invention to provide a new and improved inspection system for component parts that does not come into contact with the part and is therefore readily adaptable to almost any assembly line or industrial process.

Another object of the present invention is to provide an inspection system for determining the critical dimension of component parts or products having varying dimensions and wherein each dimension of each product is determined.

Another object of the present invention is to provide a new and improved inspection system for component parts that is immediate, accurate, and efficiently responsive.

Other objects and features of the present invention will become apparent from the following detailed description when taken in conjunction with the drawings in which FIG. 1 is a block-schematic diagram of a preferred embodiment of the system of the present invention, and FIG. 2 is a graph illustrating the accuracy, sensitivity and resolution of the system shown in FIG. 1.

Referring now specifically to FIG. 1, there is shown a system operative accurately and instantaneously to read out the dimensions of the workpiece 10. In the preferred embodiment of the present invention shown in FIG. 1 the workpiece 10 is shown to have a curved front surface 10a and is intended as illustrative of those parts or components having irregular surfaces. The surface 10a is not to be limited to the curvature shown and therefore may have a cam-type or other irregular surface. The sensing element or probe 20 is similar to that described in the aforementioned co-pending application. Basically the probe 20 includes parameters which form a part of the tuned circuit directly associated with the sensing oscillator 40. The nominal frequency of the sensing oscillator 40 for a fixed position of the sensing probe 20 is set at $f_s$. However, since the tuned circuit of the oscillator 40 includes sensing probe 20, relative movement between the probe 20 and a surface 10a alters the value of the tuned elements. That is, if the sensing probe 20 is a capacitance-type pickup, the capacitance will vary with the distance of the probe relative to the surface 10a of the workpiece 10. Consequently the proximity of the sensing element 20 to any surface affects the frequency of oscillator 40.

In operation the sensing probe 20 is mechanically driven at a constant frequency $f_k$. The drive mechanism comprises oscillator 25 tuned to a frequency desired for driving the probe, power amplifier 23 and the drive mechanism 21 to convert the electrical signal into a mechanical movement. The drive mechanism is incorporated directly within the probe housing 22. The oscillator 25 signal is at constant frequency $f_k$, consequently when the electrical signal is converted into a mechanical movement the amplitude that the probe 20 is driven will also be constant. This constant displacement is shown as $\Delta_{sk}$ in FIG. 1. As pointed out above, the proximity of the sensing element 20 to any surface affects the frequency of the oscillator 40; it is seen then by continuously varying the distance between the sensing probe 20 and the surface 10a of the workpiece 10, the frequency of the oscillator 40 will vary in synchronism with the mechanical drive of the probe. In essence the output of the oscillator 40 is a frequency modulated signal and the modulation amplitude of the output signal from oscillator 40 will be proportional to the frequency $f_k$ of the oscillator 25. This, of course, assumes that the probe is not varied in average distance relative to the surface of the workpiece 10.

Assuming for purposes of illustration that the workpiece 10 is moved in a straight line up and down with respect to the sensing probe 20, the relative distance between the surface 10a and the sensing probe will vary exactly in accordance with the curvature thereof. The amplitude or physical displacement of the probe from the surface 10a will vary with the distance $s_0$. With the further modulation of amplitude between the surface 10a and the probe 20 the frequency of oscillator 40 will also have a modulation amplitude proportional to $s_0$. Since the output of the sensing oscillator is a frequency modulated signal it will have a maximum frequency of $$f_{max} \approx \frac{K}{\sqrt{S_0 + \frac{\Delta_{sk}}{2}}}$$

and a minimum frequency of $$f_{min} \approx \frac{K}{\sqrt{S_0 - \frac{\Delta_{sk}}{2}}}$$

The output of the sensing oscillator 40 is fed to a mixer 41 where the varying signal is combined with a local oscillator signal from a voltage controlled local oscillator 47. The local oscillator signal is set with a mean frequency but is also of a design operative to vary its output about its mean frequency. The difference signal from mixer 41, the frequency modulated signal varying above and below a mean frequency, is demodulated in a discriminator 41. The output of the discriminator 42 is then fed to an automatic frequency control circuit 45. This circuit in turn varies the frequency of the local oscillator 47 above or below its mean frequency directly proportional to the frequency shift of oscillator 40. In essence then, the frequency component of the system is maintained at balance by the closed loop arrangement.

In this way the loop balancing signal is directly related to the distance $S_0$ with its amplitude and polarity being continuously indicative of the degree and direction of movement of the probe 20.

As mentioned above, the maximum modulation amplitude of the output signal from oscillator 40 will be directly proportional to the distance $S_0$, that is, the distance between limits of movement of the probe 20 relative to the surface 10a. The resultant signal output from the discriminator 42 will have a frequency of that of the probe drive frequency with a peak-to-peak amplitude proportional to the distance $S_0$. This signal is fed to a bandpass filter 50 to remove the extraneous components and then converted by amplitude analog converter 51 to a D.C. analog signal having a magnitude varying directly in proportion to the distance $S_0$. The D.C. output signal from converter 51 is fed to a signal comparison circuit 52. Also fed to circuit 52 is a reference voltage from the voltage divider network 53 comprising a voltage source 56 grounded at end 54 and connected across a variable resistor 55. The reference voltage is varied by the tap 57.

The difference signal from the comparison circuit 52 is integrated in the integrating circuit comprising capacitor 59 connected to ground 60 and one side of the resistor 58. The integrated signal varying in degree and direction in accordance with the error is amplified by the servo amplifier 70 and then fed via line 71 to a servo drive element 33. The servo drive element 33 in turn actuates servo 30 for a time and direction in accordance with the error signal fed thereto. The actuation of servo 30 through a suitable linkage arrangement shown as gears 31 and 32, repositions the sensing probe 20 relative to the surface 10a. In this way the distance between the surface 10a and the probe 20 remains constant by continuous repositioning of the probe.

In order to convey the information with respect to the static positioning of the probe 20 to a readout system, there is coupled to the servo positioning mechanism 32, a linear displacement transducer 35. This transducer may be of conventional form and the information may be, for instance, remotely recorded as an analog output. Other suitable readout means may of course be substituted therefor.

Referring now to FIG. 2, there is shown a graphical representation of the sensitivity and accuracy of the system of the preferred embodiment illustrated in FIG. 1. There is plotted in this graph the peak-to-peak amplitude of the signal $e_s$ versus the distance $s_0$ of the probe from the surface 10a. The data shown was taken with a non-contacting instrument such as that disclosed in the aforementioned co-pending application.

It is apparent from the graph of FIG. 2 that the accuracy of the system of FIG. 1 is limited only by the possible resolution of the servo positioning elements and position transducer; or alternatively by the signal responsive elements. Similarly, the accuracy of the system in all probability exceeds the linearity of the readout transducer. However, again it is apparent that the positioning elements shown are illustrative and more accurate means are known to those skilled in the art. It can be appreciated by those so skilled that the reference voltage from source 53 may be from another and similar non-contacting probe following a standard sample in synchronism with the workpiece.

The system is operative to convert the peak-to-peak amplitude of the signal generated by a non-contacting pickup probe as a function of the average distance between the probe and the surface sensed. Therefore, by maintaining the peak-to-peak amplitude of the signal constant by repositioning of the probe, the system assures that the relative spacing between the probe and the surface sensed is constant. The system is extremely accurate, sensitive and has a high resolution.

Although a certain and specific embodiment has been shown and described, it is to be understood that modifications and departures may be had thereto without departing from the true spirit and scope of the invention.

We claim:

1. A system for measuring the dimensions of a workpiece comprising, a non-contacting sensor having an electrical parameter variable in accordance with the distance from a workpiece in one direction, positioning means for said sensor, a sensing oscillator producing a frequency shift with respect to displacement of said sensor, means connecting said variable electrical parameter of said sensor to said oscillator to frequency modulate the same in accordance with any variation in distance between said sensor and said workpiece, a local oscillator, means for beating the output of said sensing oscillator with said local oscillator signal, means for discriminating the beat signal, and means for connecting the discriminated output in a closed loop circuit to said local oscillator for maintaining a reference level with respect to the frequency shift of said sensing oscillator; means also connected to the output of said discriminator for converting said beat signal to an analog signal, a reference analog signal producing means, means for comparing said two analog signals to produce a difference analog signal, and means for connecting the difference analog signal to said positioning means of said sensor for repositioning the same to a reference distance.

2. A system for measuring the dimensions of a workpiece comprising, a non-contacting distance sensor, means for driving said sensor with a fixed frequency signal means for establishing a reference distance, repositioning means for varying the relative positions of said workpiece and said sensor in a parallel direction by a sensor and in a cross direction by a drive mechanism, said sensor operative to detect electrically any variation in distance from said reference distance, a first electrical circuit, means connecting said sensor to said first circuit to modulate the output thereof in accordance with said variations, a reference circuit, mixer means for comparing the outputs of said first circuit with that of said reference circuit and producing a modulation component, a discriminator for separating the modulation component of the output signal of said mixer, means connecting said modulation component to said reference circuit to continuously maintain said reference circuit at a reference level with respect to the modulated output of said first circuit; means connected to said repositioning means from said discriminator for utilizing said electrical variations indicative of variations in distance for instantaneously repositioning said sensor to said reference distance, and means connected to said repositioning means for indicating the linear displacement of said sensor relative to said workpiece.

3. A system for measuring the dimensions of a workpiece comprising, a non-contacting distance sensor, means for driving said sensor in a first direction with a fixed frequency signal means for establishing a reference distance, means for varying the relative positions of said workpiece and said sensor in a second direction, said distance sensor electrically sensing any variation in distance from said reference distance, a first electrical circuit, means connecting said sensor thereto to modulate the output thereof in accordance with the said variation in distance, a reference circuit, mixer means for comparing the output of said first circuit signal with that of said reference circuit, a discriminator connected to said mixer for separating the modulation component of the output signal of said mixer, means connecting said modulation component to said reference circuit to continuously maintain said reference circuit at a reference level, means also connected to said discriminating means for converting said modulation component into a voltage, said voltage varying in sense and degree in relation to said variation in distance between said sensor and said workpiece, means producing a reference voltage fixed in amplitude with respect to said reference distance, means for comparing said two voltages for deriving a difference voltage, and means for utilizing said difference voltage to reposition said sensor to said reference distance.

4. A system for measuring the dimensions of a workpiece comprising, a non-contacting sensor having an electrical parameter variable in accordance with the distance from a workpiece in one direction, repositioning means for moving the sensor parallel to said direction means for varying the relative positions of said sensor and said workpiece in a second direction, a sensing oscillator producing a sensible output, means connecting said sensor to modulate said oscillator in accordance with any variation in distance between said sensor and said workpiece, a local oscillator for producing a local oscillator signal, a mixer for beating the sensible output of said sensing oscillator with said local oscillator signal, means for discriminating the beat signal, and means for connecting the discriminated output in a closed loop circuit to said local oscillator for maintaining a reference level; means also connecting the output of said discriminator to repositioning means for said sensor to displace the sensor to a reference distance.

5. A system as set forth in claim 1 wherein said means for positioning said sensor comprises a servo drive mechanism.

6. A system as set forth in claim 3 wherein said means for repositioning said sensor comprises a servo drive mechanism.

7. A system as set forth in claim 2 also comprising means for indicating said last named difference voltage to indicate the linear displacement of said sensor relative to said workpiece.

References Cited by the Examiner

UNITED STATES PATENTS

| | | | |
|---|---|---|---|
| 2,796,756 | 6/1957 | Yates et al. | 73—1 |
| 3,048,775 | 8/1962 | Calvert | 324—61 |
| 3,180,136 | 4/1965 | Foster | 73—71.4 |

FOREIGN PATENTS

| | | |
|---|---|---|
| 216,854 | 9/1958 | Australia. |
| 201,985 | 1/1923 | Great Britain. |
| 806,606 | 12/1958 | Great Britain. |
| 847,130 | 9/1960 | Great Britain. |

OTHER REFERENCES

Article by J. Norbury entitled, "A Sensitive Mircrometer for Measuring Small Displacements," in June 1958 issue of Journal of Scientific Instruments, pp. 217–220.

RICHARD C. QUEISSER, *Primary Examiner.*

JOHN P. BEAUCHAMP, *Examiner.*